(12) United States Patent
Kusumi et al.

(10) Patent No.: US 6,690,528 B1
(45) Date of Patent: Feb. 10, 2004

(54) RECORDING AND REPRODUCTION APPARATUS

(75) Inventors: Ryuji Kusumi, Tokyo (JP); Seiya Hamabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 399 days.

(21) Appl. No.: 09/677,791

(22) Filed: Oct. 2, 2000

(30) Foreign Application Priority Data

Sep. 30, 1999 (JP) .......................................... P11-280019

(51) Int. Cl.[7] .............................................. G11B 15/18
(52) U.S. Cl. .......................................... 360/69; 360/241
(58) Field of Search .............................. 360/69, 88, 94, 360/241, 85; 369/75.1

(56) References Cited

U.S. PATENT DOCUMENTS

| | | | |
|---|---|---|---|
| 4,782,408 A | * 11/1988 | Inoue et al. | 360/96.5 |
| 4,835,636 A | 5/1989 | Kanai et al. | 360/96.5 |
| 4,851,938 A | 7/1989 | Inami | 360/69 |
| 5,046,169 A | * 9/1991 | Tsujino | 360/96.5 |
| 5,082,195 A | * 1/1992 | Saito et al. | 242/336 |
| 5,150,264 A | * 9/1992 | Nakabayashi | 360/71 |
| 5,264,973 A | * 11/1993 | Seo et al. | 360/85 |
| 5,386,329 A | * 1/1995 | Ikegawa | 360/94 |
| 5,566,037 A | * 10/1996 | Kasai et al. | 360/94 |
| 5,889,632 A | * 3/1999 | Aoki | 360/94 |
| 6,175,468 B1 | * 1/2001 | Koizumi et al. | 360/94 |

FOREIGN PATENT DOCUMENTS

| | | | |
|---|---|---|---|
| GB | 2311648 | 10/1997 | G11B/15/675 |
| JP | 6119074 | 8/1986 | G11B/15/675 |

* cited by examiner

*Primary Examiner*—David Hudspeth
*Assistant Examiner*—K. Wong
(74) *Attorney, Agent, or Firm*—Jay H. Maioli (57) ABSTRACT

A recording and reproduction apparatus has a medium door which is disposed on the front of a medium insertion slot and opens or closes the medium insertion slot. An opening and closing mechanism allows the medium door to enter the medium insertion slot in response to an operation of trying to insert a predetermined medium into the medium insertion slot thereby to open the medium insertion slot.

15 Claims, 9 Drawing Sheets

RECORDING AND REPRODUCTION APPARATUS

BACKGROUND OF THE INVENTION

This invention relates to a recording and reproduction apparatus having a medium door which is disposed in the front of a medium insertion slot and opens and closes the medium insertion slot.

A video deck or a like apparatus into which a medium such as, for example, a cassette tape is inserted has a medium door which is disposed in the front of a medium insertion slot. The medium door has a fulcrum axis at an upper portion of the medium insertion slot, and a bottom portion of the medium door is pushed in and pivoted toward the inside around the fulcrum axis to effect opening or closing of the medium door.

In most of recording and reproduction apparatus, when a medium is inserted into the medium insertion slot, the medium itself pushes the medium door open and is inserted into the medium insertion slot. On the other hand, when the medium is to be discharged, the medium door is opened by an opening and closing lever of a medium loading apparatus and is closed by the weight of the medium door itself and force of a return spring.

However, the medium door of a conventional recording and reproduction apparatus which has such a structure as described above has such problems as described below.

First, since the medium mounting apparatus and the medium door must be mechanically linked to each other, where they are assembled as a set, when they are incorporated into a front panel, the positions of the opening and closing lever are liable to be offset from each other. Therefore, considerable attention is required when an assembling operation is performed.

Second, the opening and closing speeds of the medium door are automatically determined by the self weight of the medium door and the force of the return spring as well as the torque of a damper applied to the medium door. Consequently, the opening and closing speeds and the opening and closing timings cannot be changed.

Third, if, upon insertion of a medium or the like, a finger is held by the medium door when the medium door is closed, then an articulation of the finger is caught by the medium door and, if the finger is pulled out forcibly, then the finger may be injured.

Fourth, in order to provide a double insertion prevention mechanism for preventing, when a medium is inserted in the medium loading apparatus, another medium from being loaded, a separate mechanism is required.

SUMMARY OF THE INVENTION

It is an object of the present invention to provide a recording and reproduction apparatus wherein a medium mounting apparatus and a medium door can be assembled readily.

It is another object of the present invention to provide a recording and reproduction apparatus wherein opening and closing speeds and opening and closing timings of a medium door can be changed.

It is a further object of the present invention to provide a recording and reproduction apparatus which prevents a finger from being caught by a medium door when the medium door is closed.

It is a still further object of the present invention to provide a recording and reproduction apparatus which prevents double insertion of two cassettes with a simple structure.

In order to attain the objects described above, according to an aspect of the present invention, there is provided a recording and reproduction apparatus, comprising a body having a medium insertion slot formed therein, a medium door provided at the medium insertion slot, and opening and closing means for allowing the medium door to enter the medium insertion slot in response to an operation of trying to insert a medium into the medium insertion slot thereby to open the medium insertion slot.

With the first recording and reproduction apparatus, since the medium door enters the inside of the medium insertion slot to open the medium insertion slot large, the medium door does not disturb a movement of a finger upon insertion of a medium, and consequently, insertion of a medium is facilitated.

Preferably, the opening and closing means includes a driving mechanism disposed on the back face side of a front panel of the body, and an arm member engaged with the drive mechanism and coupled to the medium door. Since the driving section for driving the medium door having the construction described above is disposed on the front panel, there is no necessity to perform mechanical positioning between a medium mounting apparatus including the opening and closing means and the medium door, and operation when the front panel is to be attached to the body can be facilitated.

Preferably, the medium door is selected such that, when the medium door is opened, the medium door is positioned at an upper portion of the medium insertion slot and restricts movement of the medium in an upward direction. With the structure of the medium door, since, when the medium door is opened, it is positioned at the upper portion of the medium insertion slot, the medium can be guided for insertion and removal.

According to another aspect of the present invention, there is provided a recording and reproduction apparatus, comprising a body having a medium insertion slot formed therein into which a medium is to be inserted, a medium door provided in the front of the medium insertion slot for opening and closing the medium insertion slot, an opening and closing motor for pivoting the medium door through a gear mechanism, closed position detection means for detecting a closed state of the medium door at a closed position of the medium door and outputting a closed position signal, open position detection means for detecting an open state of the medium door at an open position of the medium door and outputting an open position signal, medium detection means for detecting whether or not a medium is present in the medium insertion slot and outputting a medium presence/absence signal, and microcomputer means for receiving the closed position signal, the open position signal and the medium presence/absence signal and controlling at least one of an opening or closing speed, an opening or closing timing, an open state and a closed state of the medium door in response to the received signals.

With the second recording and reproduction apparatus, since opening and closing of the medium door are electrically controlled by the microcomputer, the opening and closing speeds of the medium door, the opening and closing timings and so forth can be controlled easily.

Further, since the open position detection means and the closed position detection means are provided independently of each other, also an intermediate operation during opening or closing of the medium door can be recognized. Consequently, even if such an abnormal operation as a "finger catch" occurs, this state can be detected readily, and it is possible to cope with a finger catch by performing reverse rotation of the opening and closing motor.

Furthermore, since it is possible to electrically control the medium door so as to be closed when a medium is mounted, prevention of double insertion of 2 media can be realized readily without using a mechanical locking mechanism.

In addition, since both of the open position detection means and the closed position detection means detect the open position and the closed position of the medium door, respectively, the medium door can be opened or closed even if it is driven by a finger from the medium door side.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENT

Figure 1:
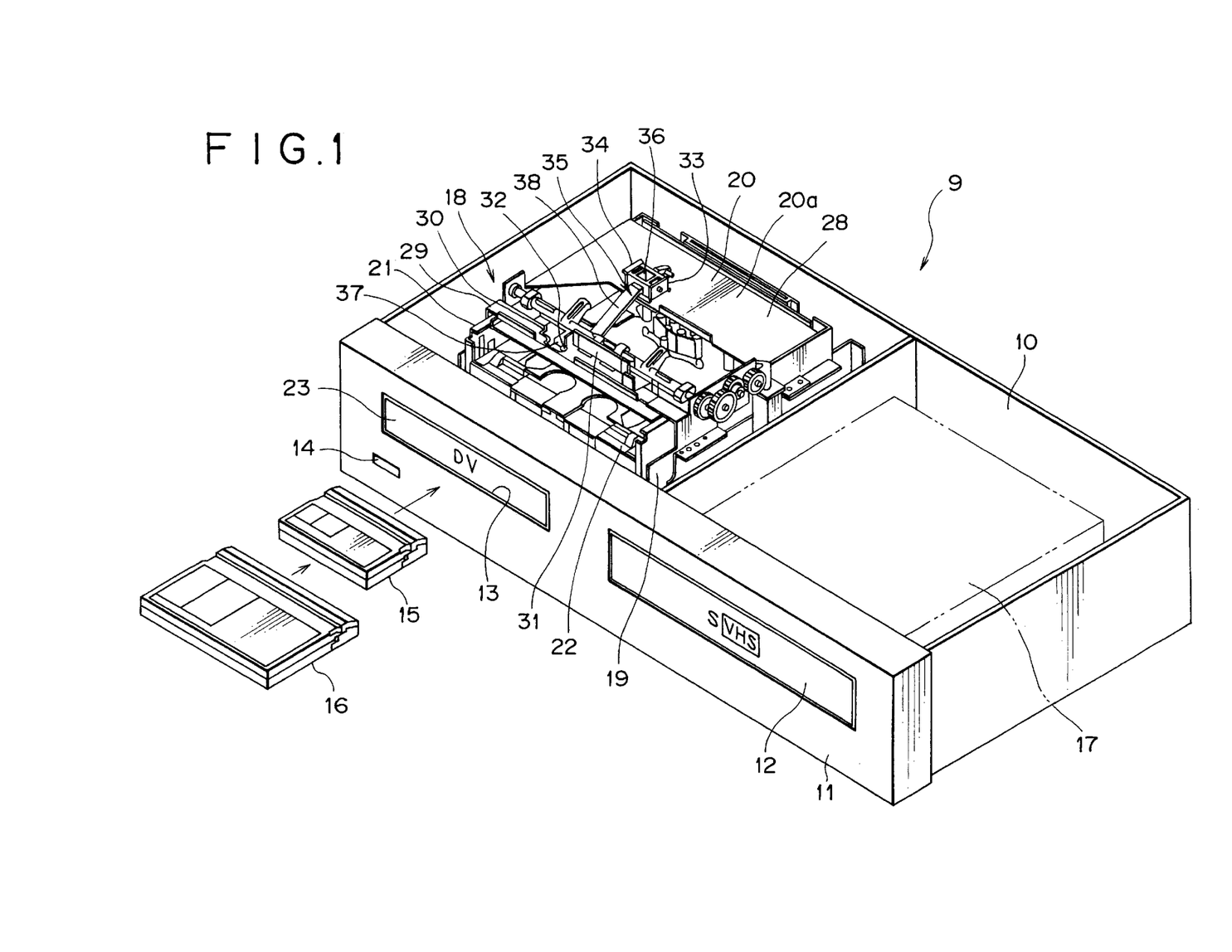
FIG. 1 is a perspective view schematically showing an internal structure of a recording and reproduction apparatus to which the present invention is applied as viewed from a front panel side.

Referring first to FIGS. 1 to 5, there is shown a recording and reproduction apparatus to which the present invention is applied. The recording and reproduction apparatus is generally denoted at 9 and formed, for example, as a video deck. The recording and reproduction apparatus includes a cassette body 10 which is formed as a frame of a rectangular box shape. A rectangular front panel 11 having a rather great thickness is disposed on the front of the cassette body of the recording and reproduction apparatus 9 as shown in FIG. 1. A rectangular medium insertion slot 12 into which a VHS (Video Home System) tape or the like is to be inserted is disposed at a right portion of a front wall of the front panel 11 of the recording and reproduction apparatus 9. Another medium insertion slot 13 into which another medium which is, for example, a DV (digital video) cassette tape or the like is to be inserted is provided leftwardly of the medium insertion slot 12 of the front wall of the front panel 11. Further, an operation switch 14 to be used, for example, to insert or discharge a medium or to open or close a medium door, which is hereinafter described, and so forth are disposed at a corner of the front face of the front panel 11 leftwardly downwardly of the medium insertion slot 13.

The medium insertion slot 13 is formed as an insertion slot of the double cassette type into which one of a medium 15 such as a cassette tape of a small size and another medium 16 such as a cassette tape of a large size can be selectively inserted.

A unit section 17 is provided in the inside of the cassette body 10 positioned rearwardly of the medium insertion slot 12, and various devices necessary for recording onto and reproduction from a medium inserted from the medium insertion slot 12 and so forth are disposed on the unit section 17. The unit section 17 is an element which does not directly relate to the present invention, and therefore, description of it is omitted herein.

Another unit section 18 is provided in a portion of the inside of the cassette body 10 positioned rearwardly the medium insertion slot 13. Various devices, mechanisms and so forth necessary for recording onto and reproduction from a medium 15 or another medium 16 inserted from the medium insertion slot 13 are disposed on the unit section 18.

In the unit section 18, a video mechanism deck section 19 is secured to a bottom portion of the cassette body 10, and an operation unit 20 to be used to discharge a medium 15 or another medium 16 from the inside of the deck is placed on the video mechanism deck section 19.

The video mechanism deck section 19 is constructed such that a base 22 into which a medium 15 or the like can be inserted is disposed on a base frame 21 adjacent the front panel 11 such that the base 22 may be in register with a bottom portion of the medium insertion slot 13. The base frame 21 has a U-shaped cross section and is disposed with its opening directed upwardly.

Figure 2:
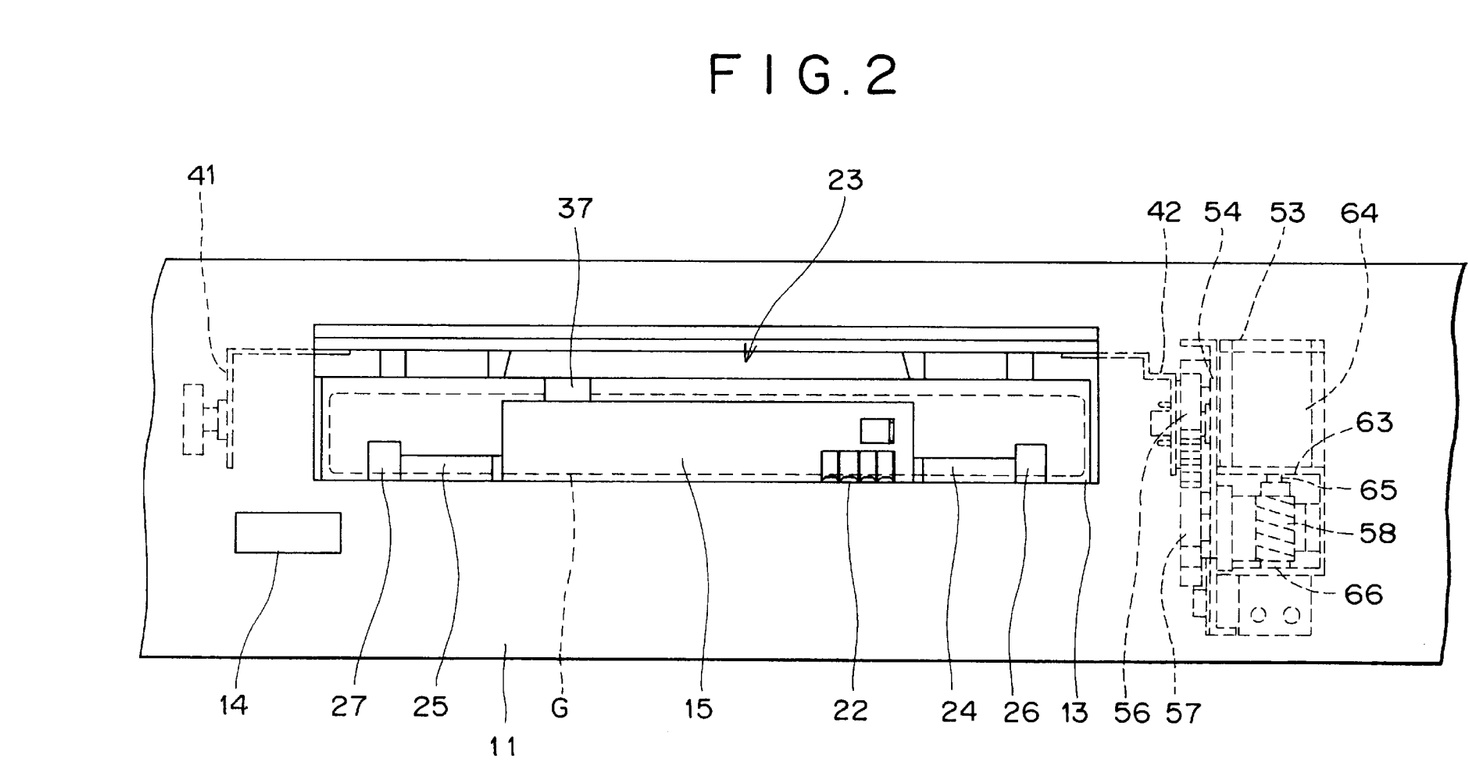
FIG. 2 is a partial front elevational view of the recording and reproduction apparatus when a medium door is open with a medium inserted in a medium insertion slot.

FIG. 2 shows the front panel 11 of the recording and reproduction apparatus 9 when a medium door 23 for covering the medium insertion slot 13 is pivoted upwardly to an open position as viewed from forwardly of the front panel 11. In FIG. 2, a medium 15 of the small size is shown inserted in the medium insertion slot 13 with the bottom thereof contacting with the base 22 at the bottom portion of the medium insertion slot 13.

A pair of guides 24 and 25 are disposed on the opposite sides of the medium 15 such that they project from the face of the base 22 as shown in FIG. 2 when a medium 15 of the small size is inserted but are retracted to the face of the base 22 if they are pressed from above. The guides 24 and 25 restrict movement of the medium 15 in a lateral direction.

A pair of introduction members 26 and 27 having such a shape that they rise in an upward slope in an insertion direction of the medium 15 are disposed on the outer sides of the guides 24 and 25, respectively. When the introduction members 26 and 27 are pressed down, the guides 24 and 25 are pressed down to the face of the base 22 to retract the medium 15 to the face of the base 22.

Consequently, if a medium 16 of the large size is inserted into a range indicated by a broken line G in FIG. 2, then the introduction members 26 and 27 are first pressed down by the bottom of the medium 16 and the guides 24 and 25 are pressed down thereby. Consequently, they are registered with the face of the base 22. Therefore, also the medium 16 of the large size can be inserted into the medium insertion slot 13 without any trouble.

It is to be noted that movement of a medium 15 or another medium 16 in the thicknesswise direction, that is, in the vertical direction when it is inserted is restricted by the bottom face of the medium door 23 pivoted upwardly.

In addition, a driving apparatus for a tape built in a medium 15 or 16 and other members are accommodated in the video mechanism deck section 19. However, since they have no direct relation to the present invention, description of them is omitted to simplify the description.

The discharging unit 20 of a U shape with its opening directed downwardly is mounted on and secured to the base frame 21 of the video mechanism deck section 19. Also the base frame 21 has a U shape and is disposed with its opening directed upwardly.

An upper face of the discharging unit 20 is partly cut away, and a bridge plate 29 is disposed in the cutaway portion adjacent the front panel 11 such that it extends between the opposite sides of the discharging unit 20. A cutaway portion 30 is formed in the proximity of the center of the bridge plate 29. Further, a printed plate 31 is disposed uprightly on the bridge plate 29 in the proximity of the cutaway portion 30. A medium detection switch 32 is provided on the printed plate 31 such that it is switched ON by a moved portion 37 which is moved upwardly by a medium when the medium is inserted.

A pair of fixing plates 33 and 34 are formed on the remaining portion 20a of the upper wall of the discharging unit 20 rearwardly of the cutaway portion by partly cutting the upper wall of the discharging unit 20 open in rectangular shapes and bending the rectangular portions uprightly upwardly.

The medium frame 35 has an end serving as a fixed portion 36 which is accommodated in the fixing plates 33 and 34. The other end of the medium frame 35 serves as the moved portion 37 which is moved upwardly upon insertion of a medium 15 or another medium 16 while accompanying the medium detection switch 32 which functions as medium detection means. A portion of the medium frame 35 between the fixed portion 36 and the moved portion 37 is molded as a unitary member of a frame 38 from a synthetic resin and is positioned downwardly when no medium is inserted.

Figure 3:
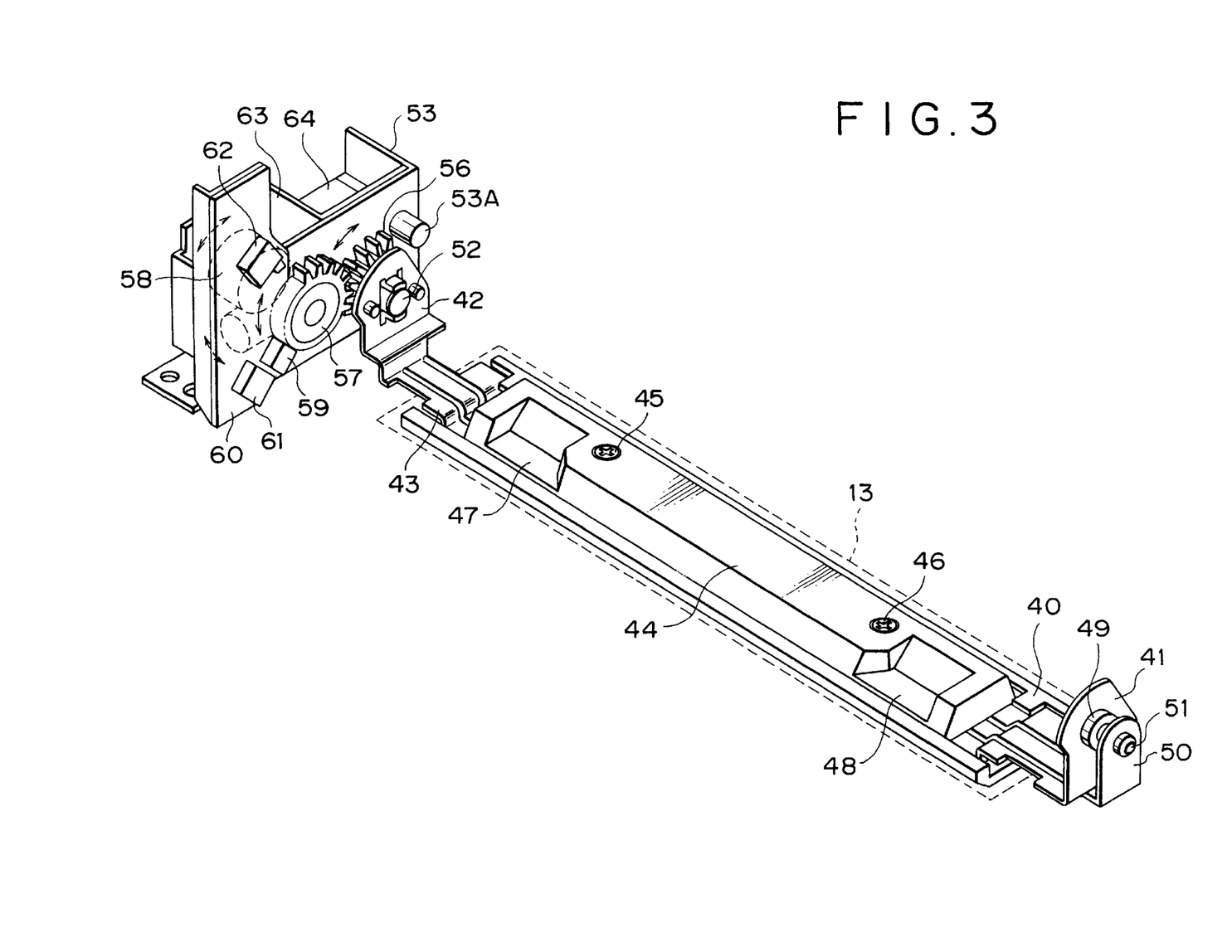
FIG. 3 is a perspective view showing several elements in the proximity of the medium door of the recording and reproduction apparatus of FIG. 2 as viewed from the rear face side of the front panel when the medium door is closed.
Figure 4:
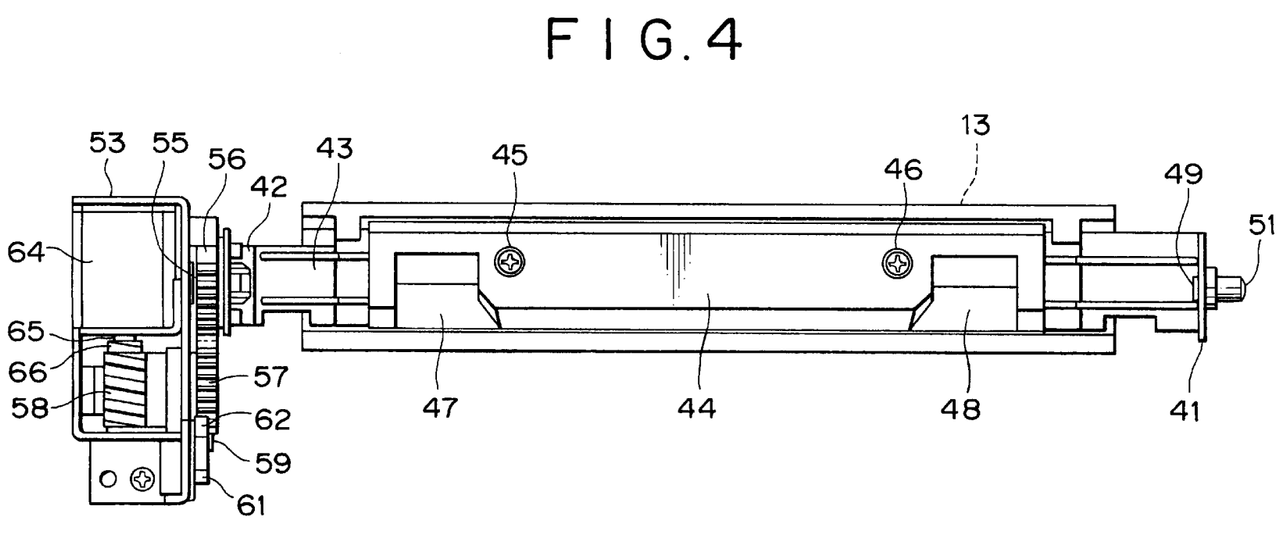
FIG. 4 is a front elevational view showing the elements shown in FIG. 3 as viewed from the rear face side of the front panel when the medium door is closed.
Figure 5:
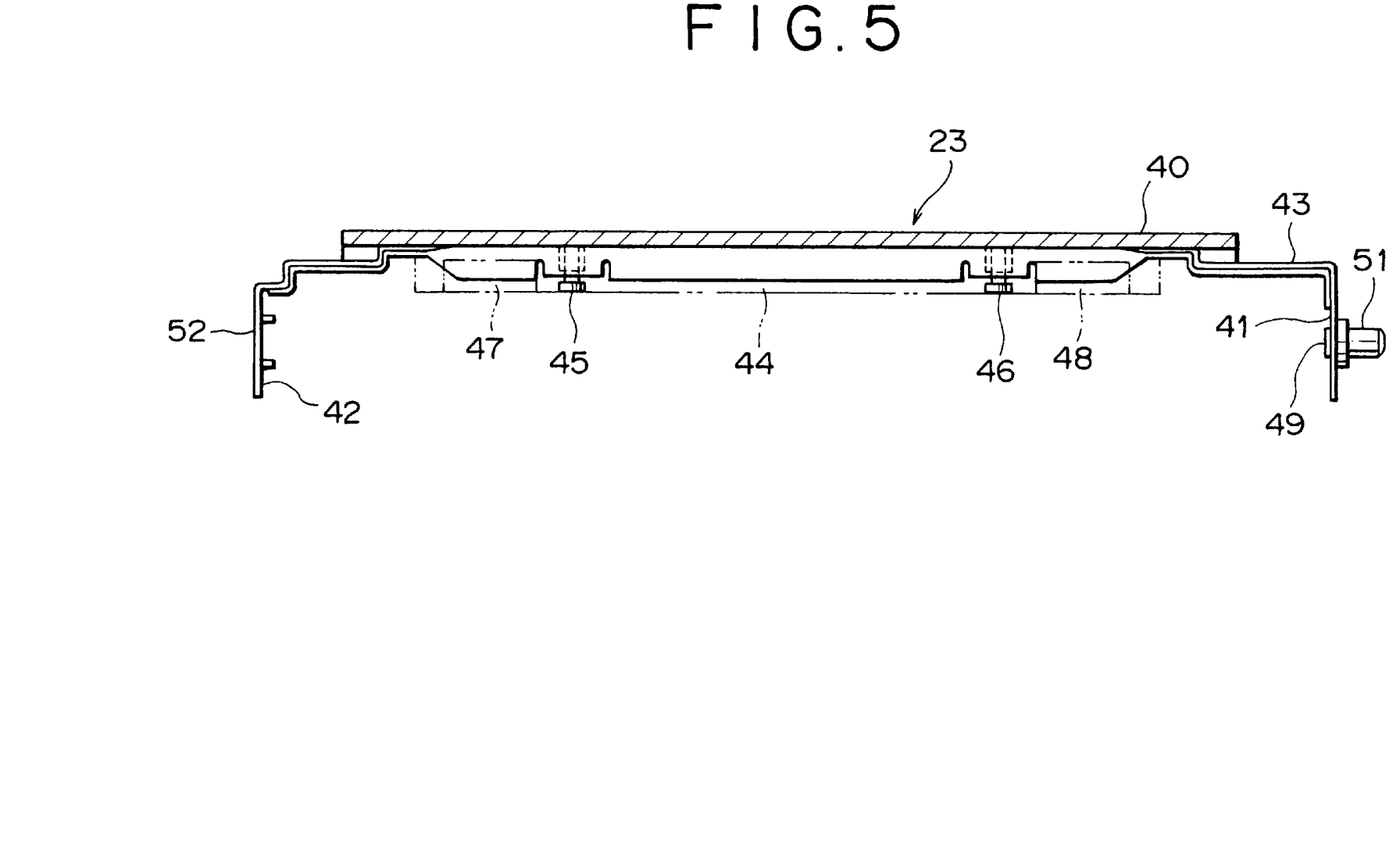
FIG. 5 is a longitudinal sectional view of part of the medium door shown in FIG. 4.

The medium door 23 is disposed on the front face of the front panel 11 such that, as viewed from the rear face of the front panel 11, a decorative plate 40 having a substantially channel-shaped cross section is fitted in the medium insertion slot 13 as shown in FIGS. 3 to 5. A door arm 43 in the form of a plate which functions as an arm member is disposed on the decorative plate 40 and has a pair of substantially L-shaped bent portions 41 and 42 at the opposite ends thereof. Further, the decorative plate 40 and the door arm 43 are secured to each other in a sandwiched state with a guide plate 44 disposed on the door arm 43 by means of a pair of screws 45 and 46.

A pair of recessed portions 47 and 48 are formed at positions of the guide plate 44 in the proximity of and corresponding to the opposite ends of the medium 15. The recessed portions 47 and 48 serve as space portions necessary for a user to grip and insert a medium 15 when the medium 15 is to be inserted so that operation for inserting or discharging a medium 15 may be facilitated.

An engaging hole 49 is perforated in the bent portion 41 erected vertically uprightly with respect to the flat face portion of the door arm 43. The engaging hole 49 is supported for pivotal motion by means of a shaft 51 and another engaging hole formed in a support plate 50. The support plate 50 is molded integrally with the front panel 11 and is erected vertically uprightly from the front panel 11.

An engaging hole 52 is formed at the center of the other bent portion 42 which is erected vertically uprightly from the flat face portion of the door arm 43. The door arm 43 is secured to the front panel 11 such that a gap is defined between the bent portion 42 and a flat face portion 54 of a frame 53 which has a substantially channel shape.

A bearing 55 is formed at a portion of the flat face portion 54 which opposes the engaging hole 52, and a door gear 56 secured to the engaging hole 52 is disposed between the flat face portion 54 and the bent portion 42. The position of the door gear 56 is restricted by a pin 53A and so forth so that the medium door 23 is pivoted from its open position to its closed position using the bearing 55 as a receiver for rotation.

A wheel gear 57 for engaging with the door gear 56 and a worm gear 58 are integrally formed on one side and the other side of the flat face portion 54 of the frame 53, respectively. The worm gear 58 has teeth formed thereon obliquely to the horizontal direction. The flat face portion 54 of the frame 53 is mounted at an intermediate portion thereof for pivotal motion on the frame 53.

The wheel gear 57 has a switch piece 59 formed at a portion thereof remote from the door gear 56. A closed position detection switch 61 and an open position detection switch 62 are secured to the frame 53 through a printed board 60 such that they are switched on/off by the switch piece 59. The closed position detection switch 61 functions as closed position detection means for detecting the closed position of the medium door 23 while the open position detection switch 62 functions as open position detection means for detecting the open position of the medium door 23.

A mounting plate 63 extends vertically to the flat face portion 54 from a portion in the proximity of the center of the flat face portion 54 of the frame 53. An opening and closing motor 64 is mounted on the mounting plate 63 such that a rotary shaft 65 thereof extends in parallel to the flat face portion 54. A worm gear 66 having teeth formed obliquely thereon is mounted on the rotary shaft 65 such that it engages with the worm gear 58.

In the construction described above, if the opening and closing motor 64 is rotated around the axis of rotation extending in the vertical direction as indicated by an arrow mark in FIG. 3, then also the worm gear 66 secured to the rotary shaft rotates around the axis of rotation, and the rotation is converted into rotation around a horizontal axis by the worm gear 58 which is in engagement with the worm gear 66.

Also the wheel gear 57 connected integrally to the worm gear 58 by the same shaft rotates around the axis of rotation extending in the horizontal direction, and this rotation is transmitted to the door gear 56 which is in engagement with the wheel gear 57. The rotation of the door gear 56 pivots the substantially L-shaped door arm 43 secured to the door gear 56 in the direction of an arrow mark of FIG. 3. As a result, in the process of transition from a closed state to an open state of the medium insertion slot 13, the medium door 23 is pivoted upwardly from the front side of the medium insertion slot 13 into the inside of the medium insertion slot 13 in such a manner that it slips into the medium insertion slot 13. The medium door 23 is pivoted over a range of 90 degrees and the medium insertion slot 13 is opened or closed with the medium door 23 in this manner.

Since the medium door 23 has such a structure as described above and the driving section for driving the medium door 23 is mounted on the front panel 11, there is no necessity to perform mechanical positioning between the medium mounting apparatus and the medium door 23, and a catch of a positioning arm when the front panel 11 is to be attached to the set body 10 is eliminated and the attaching operation is facilitated.

Subsequently, a construction of a system control section for controlling such opening and closing of the medium door 23 as described above is described with reference to FIG. 6. A door driving mechanism 70 which functions as opening and closing means is formed from the door gear 56, wheel gear 57, worm gear 58, worm gear 66, medium detection switch 32 and so forth. The medium door 23 is connected for pivotal motion through the door gear 56 to the door driving mechanism 70.

Figure 6:
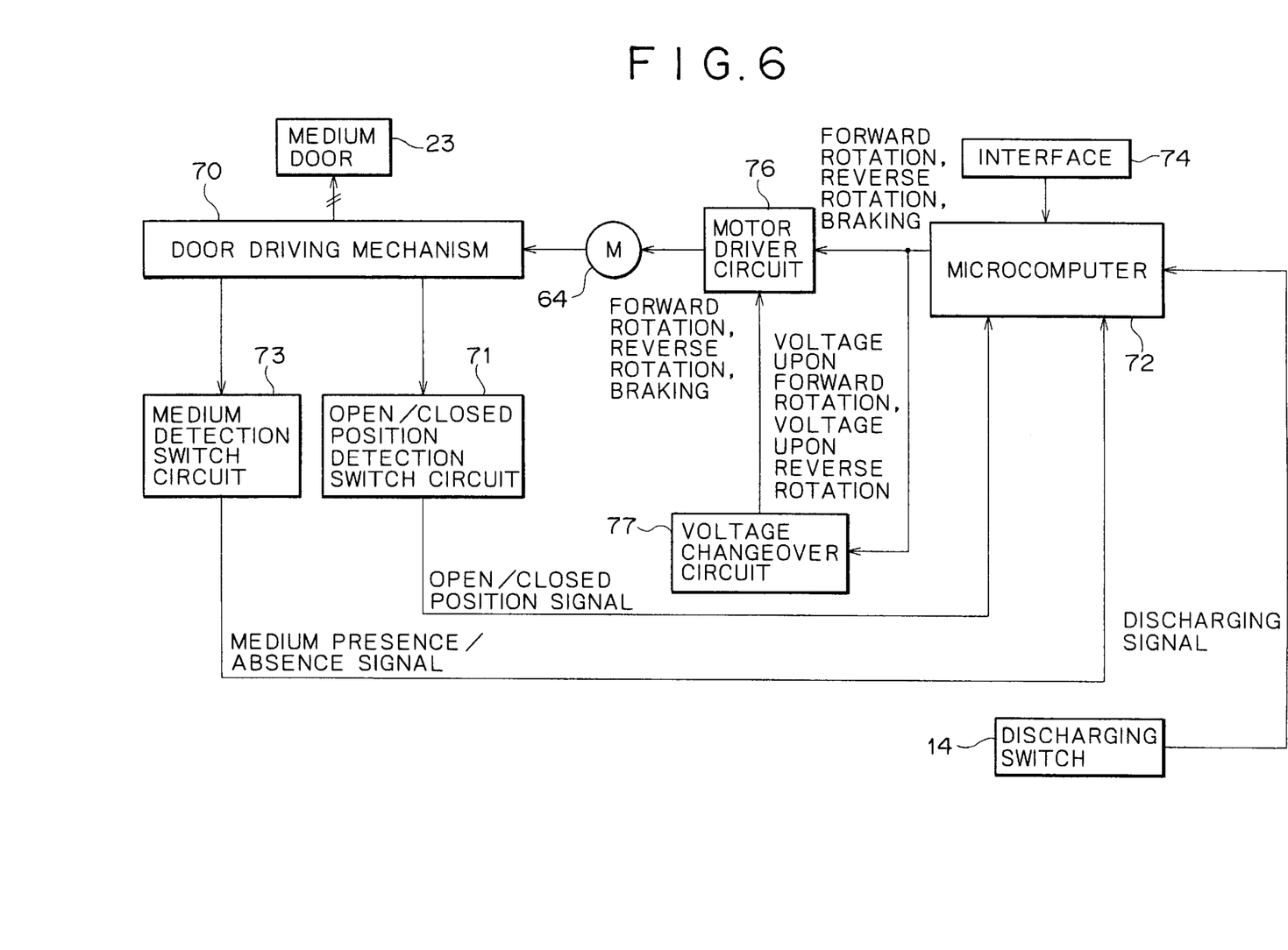
FIG. 6 is a block diagram showing a construction of a control section of the recording and reproduction apparatus of FIG. 1 for controlling opening and closing of the medium door.

An opening/closing switch circuit 71 processes on/off signals from the open position detection switch 62 and the closed position detection switch 61 which are operated by the switch piece 59 provided integrally with the wheel gear 57 upon rotation of the wheel gear 57, and transmits an open position signal or a closed position signal to a microcomputer 72 which functions as microcomputer means.

A medium detection switch circuit 73 processes an on/off signal detected by the medium detection switch 32, which detects whether or not a medium 15 or another medium 16 is inserted, and transmits a resulting signal as a medium presence/absence signal to the microcomputer 72.

A microprocessor CPU, a memory MEM and so forth not shown are built in the microcomputer 72. The microprocessor CPU controls a sequence of opening and closing operations of the medium door 23 which is hereinafter described. A program for the sequence of operations and so forth is stored in the memory MEM. Further, also a setting signal from an interface 74 for setting various operation times and so forth and a medium discharging signal from the operation switch 14 for indicating discharging of a medium are inputted to the microcomputer 72.

In response to the open position signal, close position signal, medium presence/absence signal, discharging signal, setting signal from the interface 74 and so forth, the microcomputer 72 can arbitrarily control the operation of the opening and closing motor 64 44 such as forward rotation, reverse rotation or braking through a motor driver circuit 76. In this instance, the motor driver circuit 76 receives an instruction from a voltage changeover circuit 77 and can control the opening and closing motor 64 in accordance with the instruction. The voltage changeover circuit 77 functions as voltage changeover means for changing over the magnitude of the voltage to be applied to the opening and closing motor 64 so that it may be different depending upon whether the opening and closing motor 64 should rotate forwardly or reversely. Since the driving voltage can be set freely and besides the speed of rotation can be changed over separately depending upon forward rotation or reverse rotation in this manner, an impact sound upon closing of the medium door 23 can be reduced.

Subsequently, a procedure of controlling opening and closing operations of the medium door 23 under the control of the system control section shown in FIG. 6 having such a construction as described above is described with reference to flow charts shown in FIGS. 7 to 9. A program for execution of the flows is stored in the memory MEM built in the microcomputer 72 and is executed by the microprocessor CPU.

In the following description, it is presupposed that the medium door 23 normally is in a closing state and the basic opening and closing operations of the medium door 23 are such that, upon opening, the microcomputer 72 causes the opening and closing motor 64 to rotate forwardly and stop at the open position of the medium door 23, but upon closing, the microcomputer 72 causes the opening and closing motor 64 to rotate reversely and stop at the closing position of the medium door 23.

Figure 7:
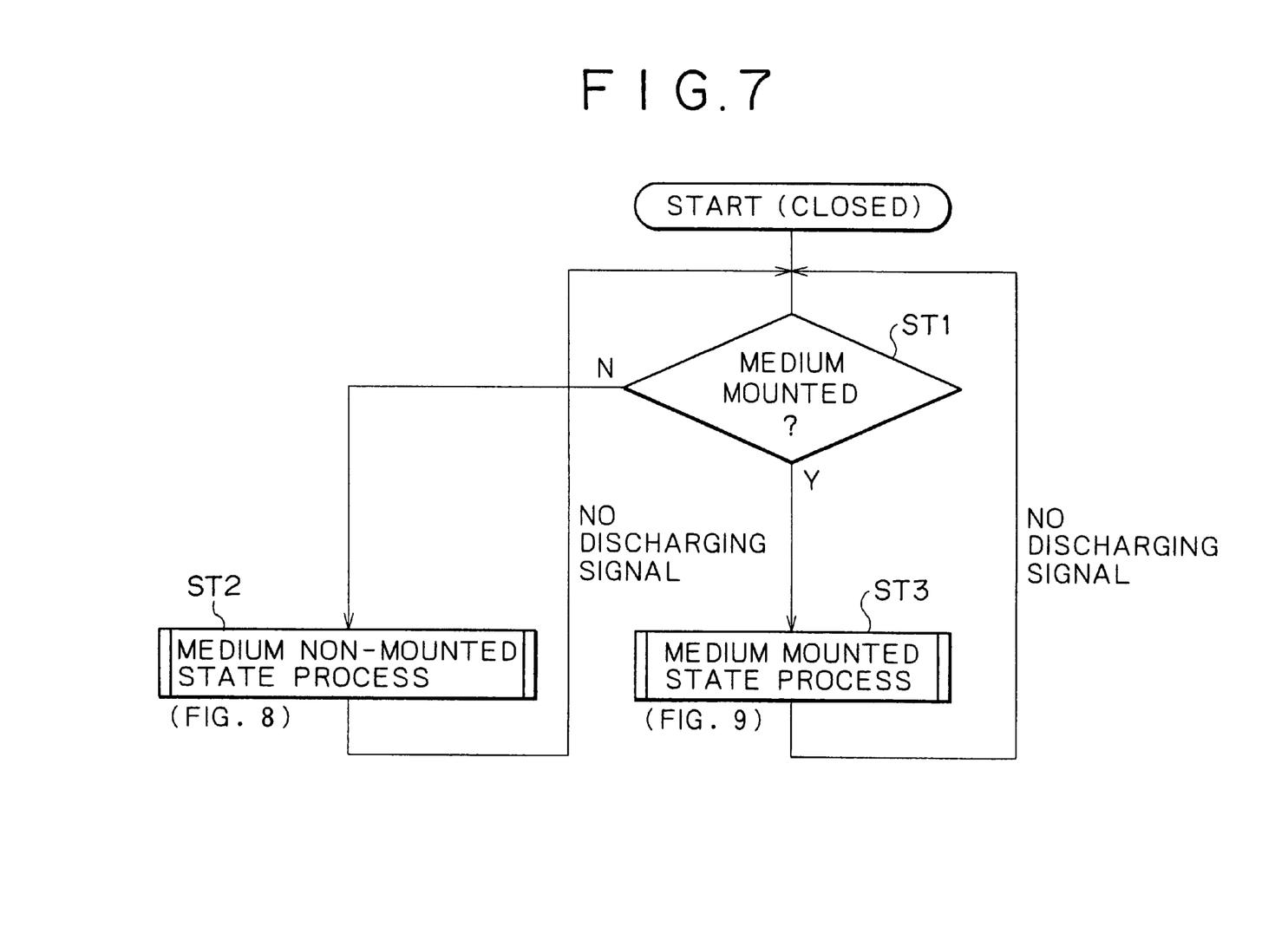
FIG. 7 is a flow chart of a procedure of a medium mount state process illustrating operation of the control section shown in FIG. 6.

Since the manner of processing is different depending upon whether or not a medium is present in the inside of the recording and reproduction apparatus 9, discrimination is performed in accordance with the flow chart of a medium mount state process illustrated in FIG. 7. Initially, the processing starts from a state wherein the medium door 23 is in the closed position.

Referring to FIG. 7, first in step ST1, the microcomputer 72 performs discrimination of whether or not a medium is mounted. If it is discriminated that a medium is not mounted (N (No) in step ST1), then the processing advances to step ST2, in which a medium nonmounted state process illustrated in FIG. 8 hereinafter described is executed. If the operation switch 14 is not depressed and consequently a discharging signal is not detected in the medium non-mounted state process in step ST2, then the processing returns to step ST1.

If it is discriminated in step ST1 that a medium is mounted (Y (Yes) in step ST1), then the processing advances to step ST3, in which a medium mounted state process illustrated in FIG. 9 which is hereinafter described is executed. If the operation switch 14 is not depressed and consequently a discharging signal is not detected in the medium mounted state process in step ST3, then the processing returns to step ST1.

Now, details of the medium non-mounted state process in step ST2 of FIG. 7 are described. Referring to FIG. 8, first in step ST4, it is discriminated whether or not the closed position detection switch 61 has changed from an ON state to an OFF state. If it is discriminated that the closed position detection switch 61 has changed from ON to OFF (Y in step ST4), then since this signifies that the medium door 23 has been put into a forced open state so that it may change from the closed state to the open state, the microcomputer 72 advances the processing to step ST8. In step ST8, the microcomputer 72 causes the opening and closing motor 64 to rotate forwardly thereby to pivot the medium door 23 in the opening direction.

In short, if a medium 15 is not mounted in the medium insertion slot 13, the microcomputer 72 performs the arithmetic operation in step ST4 and the process in step ST8 to detect that the medium door 23 has been "forced open" and perform corresponding processing.

Thereafter, the microcomputer 72 discriminates in step ST9 whether or not more than 2 seconds elapse after the start of operation of the opening and closing motor 64. If it is discriminated that more than 2 seconds do not elapse (N in step ST9), then the processing advances to step ST10, in which the microcomputer 72 discriminates whether or not the open position detection switch 62 is ON. If it is discriminated in step ST10 that the open position detection switch 62 has not become ON (N), the processing returns to step ST9, in which it is discriminated again whether or not more than 2 seconds elapse.

This operation is executed until after more than 2 seconds elapse after the start of operation of the opening and closing motor 64. Then, if it is discriminated in step ST9 that the open position detection switch 62 does not become ON even after more than 2 seconds elapse, that is, in a state wherein the medium door 23 does not become fully open even after 2seconds elapse (Y), the microcomputer 72 determines that, for example, a finger or the like is caught in the medium insertion slot 13. Thus, the microcomputer 72 performs a "finger catch process" such as to immediately stop rotation of the opening and closing motor 64 in step ST11 to prevent such a trouble that a finger is caught and injured.

In short, when a medium 15 is not mounted in the medium insertion slot 13, the microcomputer 72 executes the arithmetic operation in step ST4 and the process in step ST8 to cause the opening and closing motor to rotate forwardly, and then, if an open position signal is not recognized within a predetermined time such as, for example, 2 seconds, then the microcomputer 72 determines that a state of a "finger catch" state occurs and executes the arithmetic operations in steps ST9 and ST10 and executes the process in step sT11 to perform processing for stopping the opening and closing motor 64.

If it is discriminated in step ST10 that the open position detection switch 62 has become ON within the period of 2 seconds (Y), then the processing advances to step ST12, in which it is discriminated whether or not the open state has continued for more than 30 seconds after the open position detection switch 62 became ON. If it is discriminated that more than 30 seconds have not elapsed (N in step ST12), then the processing returns to step ST12 so that the discrimination in step ST12 is repeated until 30 seconds elapse.

As a result, if it is discriminated in step ST12 that the medium detection switch 32 cannot detect a medium within 30 seconds (Y), then the microcomputer 72 determines that the user has no will to insert a medium and advances the processing to step ST16. In step ST16, the microcomputer 72 causes the opening and closing motor 64 to rotate reversely to close the medium door 23.

It is to be noted that, if the open position detection switch 62 changes from ON to OFF when the medium door 23 is in the open state, then the microcomputer 72 determines that "force closing" has occurred, and causes the opening and closing motor 64 to rotate reversely to close the medium door 23.

In short, when a medium 15 is not mounted in the medium insertion slot 13, if the microcomputer 72 discriminates by the arithmetic operation in step ST12 that the open state of the medium door 23 continues for a predetermined time, for example, for more than 30 seconds and does not detect insertion of a medium 15 from the medium presence/ absence signal by the arithmetic operation in step ST13, then the microcomputer 72 executes the process to rotate the opening and closing motor 64 reversely to close the medium door 23 in step ST16. Then, if the microcomputer 72 recognizes, during the opening operation, in step ST5 and so forth that the open position signal has changed from the open state, then it causes the opening and closing motor 64 to rotate reversely to close the medium door 23 as a "force closing" operation in step ST16.

If it is discriminated in step S13 that the medium detection switch 32 has become ON (Y), then the processing advances to step ST14, in which the microcomputer 72 discriminates whether or not the medium mounting start switch not shown is ON.

If the medium mounting start switch is not ON, then since a state wherein a medium can be realized is not established, the processing returns to step ST13, but if the medium mounting start switch is ON, then the processing advances to step ST15, in which an insertion operation of the medium mounting apparatus is started. Then, if the mounting is completed, then the microcomputer 72 determines when 1 second elapses after completion of the mounting that a state wherein a medium can be utilized was established, and advances the processing to step ST16. In step ST16, the microcomputer 72 causes the opening and closing motor 64 to rotate reversely to close the medium door 23.

In step ST16, the microcomputer 72 causes the opening and closing motor 64 to rotate reversely to close the medium door 23, whereafter the processing advances to step ST18. In step ST18, it is discriminated whether or not more than 2 seconds have elapsed after the start of operation of the opening and closing motor 64. If 2 seconds have not elapsed, then the processing advances to step ST19, in which it is discriminated whether or not the closed position detection switch 61 is ON. If it is discriminated that the closed position detection switch 61 is not ON (N in step ST19), then the microcomputer 72 determines that the medium door 23 is not in the closed position, and returns the processing to step ST18.

When the closed position detection switch 61 is not ON in step ST19, the microcomputer 72 repeats the discriminations in steps ST18 and ST19 for 2 seconds. However, if it is discriminated in step ST18 after all that the closed position detection switch 61 does not change to ON even after 2 seconds elapse (Y), then the microcomputer 72 determines that the closing operation has been extended because of, for example, catching of a finger in the process of the closing operation of the medium door 23, and advances the processing to step ST20. In step ST20, the microcomputer 72 executes such a "finger catch process" as to immediately stop rotation of the opening and closing motor 64 thereby to prevent such a trouble that a finger is caught and injured.

In short, when a medium 15 is not mounted in the medium insertion slot 13, if the open state of the medium door 23 continues for more than a predetermined time (step ST12) and insertion of a medium 15 is detected from the medium presence/absence signal, then the microcomputer 72 causes the opening and closing motor 64 to rotate reversely to perform a closing operation (step ST16) of the medium door 23 after a predetermined time such as, for example, 1 second. Then, when the microcomputer 72 recognizes in step ST18 that the open position signal does not become an open state within a predetermined time, it determines in step ST20 that a "finger catch" has occurred and causes the opening and closing motor 64 to stop thereby to prevent such a trouble that a finger is caught and injured.

Thereafter, the processing advances to step ST19. If it is discriminated in step ST19 that the closed position detection switch 61 is ON, then the microcomputer 72 determines that the medium door 23 has come to the closed state, and causes the opening and closing motor 64 to stop, thereby ending the processing.

Figure 8:
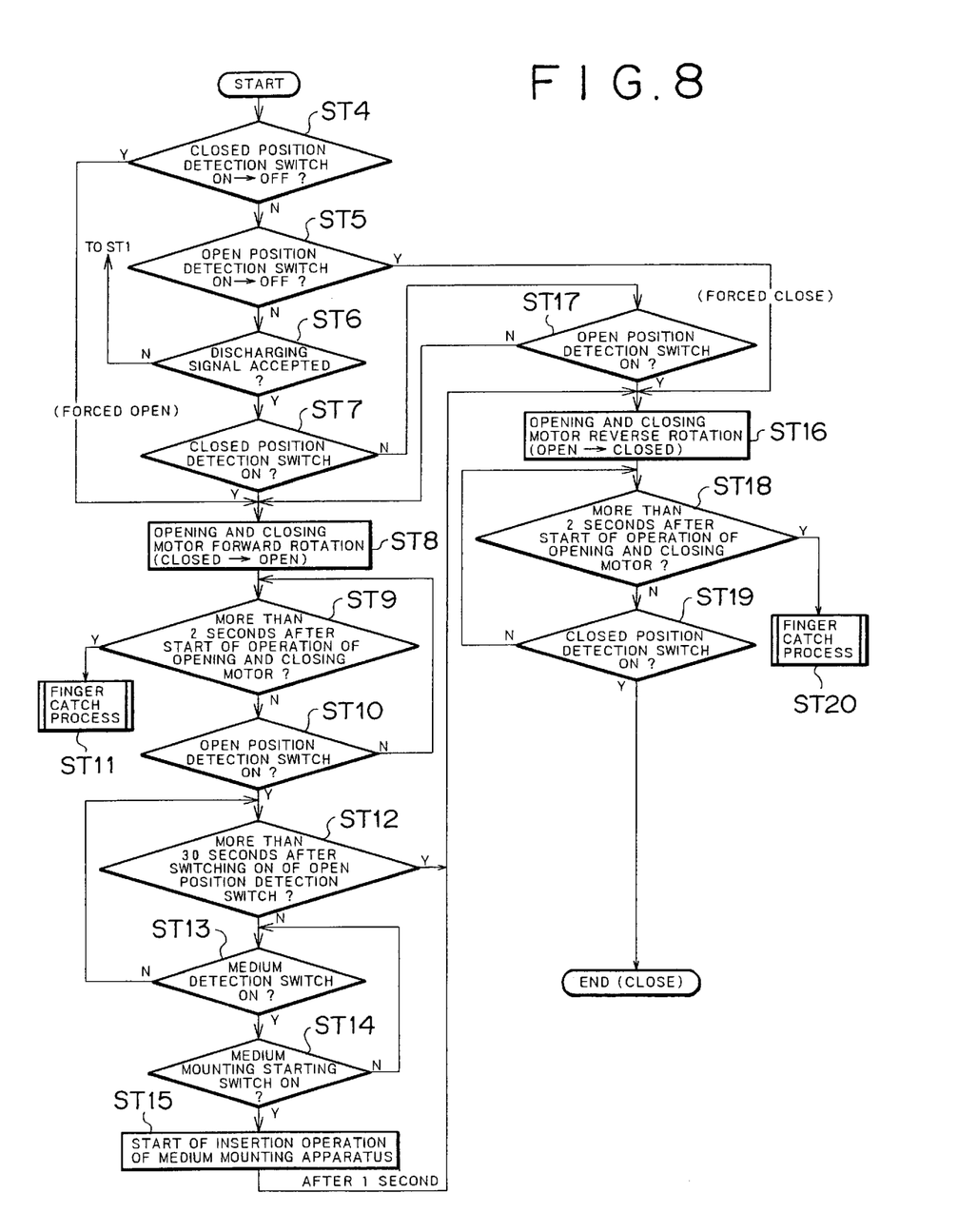
FIG. 8 is a flow chart of a procedure of a medium non-mounted state process illustrated in FIG. 7 of operation of the control section shown in FIG. 6.

Then, when the medium non-mounted state process illustrated in FIG. 8 is entered subsequently, it is discriminated in step ST4 whether or not the closed position detection switch 61 has changed from ON to OFF. Then, when it is discriminated that no change from ON to OFF has occurred (N in step ST4), that is, when the medium door 23 still remains in the closed state, the processing advances to step ST5.

In step ST5, it is discriminated whether or not the open position detection switch 62 has changed from ON to OFF. If it is discriminated also in step ST5 that no change has occurred (N), that is, when the medium door 23 is in an open state, then the processing advances to step ST6. On the other hand, if it is discriminated that the open position detection switch 62 has changed from ON to OFF (Y in step ST5), that is, when the medium door 23 is in a "force closed" state wherein transition from the open state to the closed state is proceeding, the processing advances to step ST16. In step ST16, the microcomputer 72 causes the opening and closing motor 64 to rotate reversely to open the medium door 23 thereby to eliminate the "force closed" state.

In step ST6, it is discriminated whether or not the operation switch 14 is depressed and a discharging signal is accepted. If it is discriminated that the operation switch 14 is not depressed, that is, when the medium door 23 is not ready for opening, the processing returns to step ST1 illustrated in FIG. 7, but if it is discriminated that the operation switch 14 is depressed (Y in step ST6), that is, when the medium door 23 is ready for opening, the processing advances to step ST7.

In step ST7, it is discriminated whether or not the closed position detection switch 61 is in an ON state, that is, whether or not the medium door 23 is in the closed state. If it is discriminated that the medium door 23 is in the closed state (Y in step ST7), then the processing advances, in order to cope with the discharging signal, to step ST8, in which the microcomputer 72 causes the opening and closing motor to rotate forwardly to open the medium door 23. However, if it is discriminated that the closed position detection switch 61 is not in the closed state (N in step ST7), then the processing advances to step ST17.

Then in step ST17, it is discriminated whether or not the open position detection switch 62 is in an ON state, that is, whether or not the medium door 23 is in the open state. If it is discriminated that the medium door 23 is not in the open state (N in step ST17), then the processing advances to step ST8, in which, in order to cope with the discharging signal, the microcomputer 72 causes the opening and closing motor to rotate forwardly to open the medium door 23. However, if the open position detection switch 62 is in an ON state, then the processing advances to step ST16, in which the microcomputer 72 causes the opening and closing motor 64 to rotate reversely to close the medium door 23.

Figure 9:
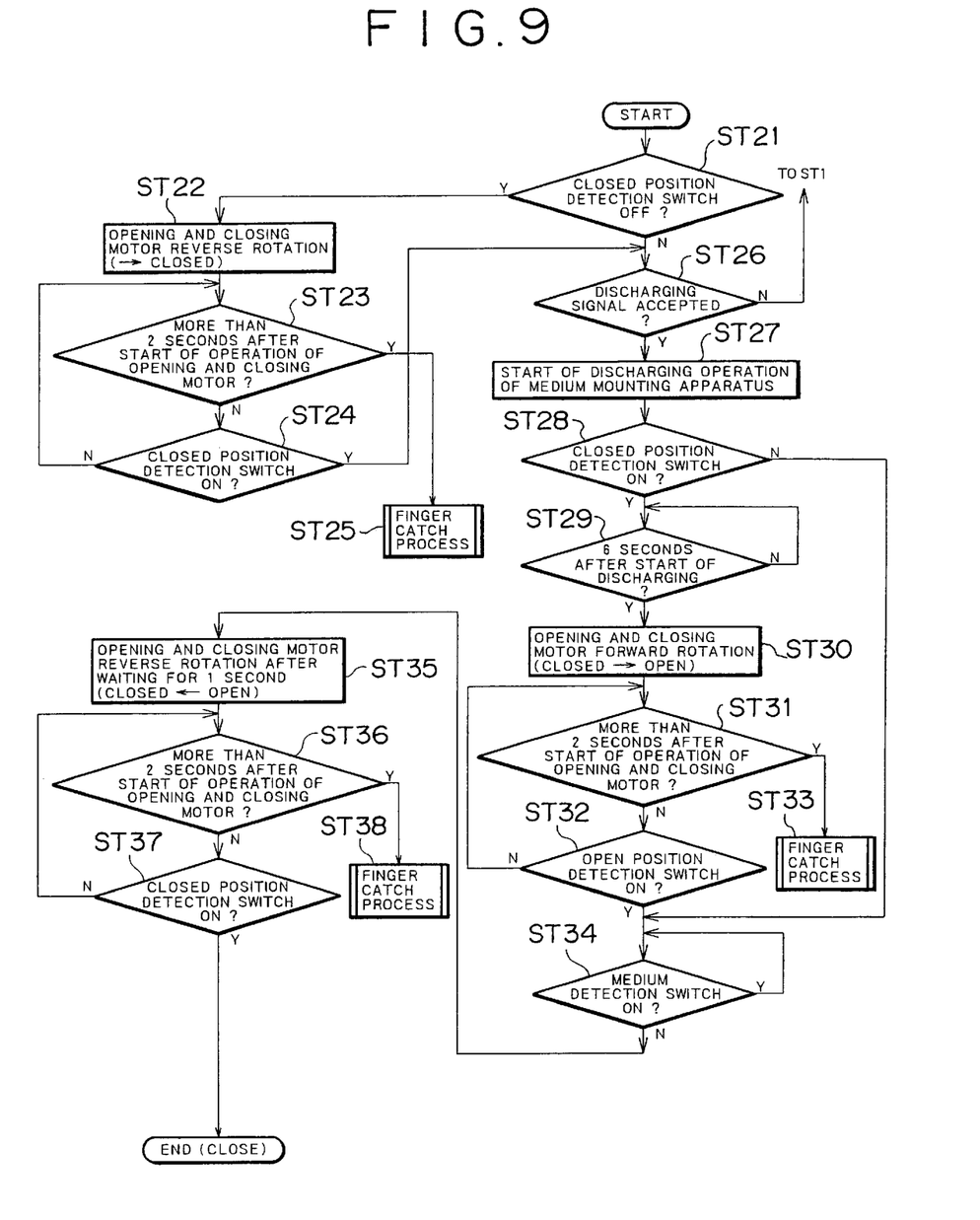
FIG. 9 is a flow chart illustrating a procedure of a medium mounted state process illustrated in FIG. 7. of operation of the control section shown in FIG. 6.

Subsequently, the medium mounted state process illustrated in FIG. 9 is described. If it is discriminated in step ST1 of FIG. 7 that a medium is mounted, then the processing advances to step ST3 in FIG. 7, in which the medium mounted state process illustrated in FIG. 9 is executed. Referring to FIG. 9. first in step ST21, it is discriminated whether or not the closed position detection switch 61 has changed from ON to OFF. If it is discriminated that the closed position detection switch 61 has changed from ON to OFF (Y in step ST21), then since this signifies that, although a medium is mounted, the medium door 23 is driven in a direction in which the medium door 23 is opened, the processing advances to step ST22. In step ST22, the microcomputer 72 causes the opening and closing motor 64 to rotate reversely to drive the medium door 23 in its closing direction.

Thereafter, the processing advances to step ST23, in which it is discriminated whether or not more than 2 seconds have elapsed after the start of operation of the opening and closing motor 64. If more than 2 seconds have not elapsed, then the processing advances to step ST24, in which it is discriminated whether or not the closed position detection switch 61 has changed to ON, that is, whether or not the medium door 23 has been closed. If it is discriminated that the medium door 23 has not been closed (N in step ST24), then the processing returns to step ST23, in which it is discriminated again whether or not more than 2 seconds have elapsed.

Those steps are repeated until after 2 seconds elapse. Then, if it is discriminated that more than 2 seconds have elapsed (Y in step ST23), then the microcomputer 72 determines that a finger catch has occurred with the medium door 23 and advances the processing to step ST25. In step ST25, the microcomputer 72 executes the "finger catch process" for stopping the opening and closing motor 64 immediately or the like thereby to prevent such a trouble that a finger is caught and injured.

If it is discriminated in step ST24 that the closed position detection switch 61 is ON (Y), that is, the medium door 23 has been closed, then the processing advances to step ST26. Also when it is discriminated in step ST21 that the closed position detection switch 61 has not changed from ON to OFF, that is, the medium door 23 remains in the closed state, the processing advances to step ST26.

In step ST26, it is discriminated whether or not the operation switch 14 is depressed. If it is discriminated that the operation switch 14 is not depressed (N in step ST26), then the processing returns to step ST1. However, if it is discriminated that the operation switch 14 is depressed (Y in step ST26), then the processing advances to step ST27, in which the microcomputer 72 causes a discharging operation of the medium mounting apparatus (not shown) for discharging a medium mounted to be started.

Thereafter, the processing advances to step ST28, in which it is discriminated whether or not the closed position detection switch 61 has changed to ON, that is, whether or not the medium door 23 has been closed. If it is discriminated that the medium door 23 has been closed (Y in step ST28), then the processing advances to step ST29, in which a waiting time of 6 seconds is placed. Thereafter, in step ST30, the microcomputer 72 causes the opening and closing motor 64 to rotate forwardly to drive the medium door 23 in the opening direction.

Then, it is discriminated in step ST31 whether or not more than 2 seconds have elapsed after the start of operation of the opening and closing motor 64. If more than 2 seconds have not elapsed, then the processing advances to step ST32, in which it is discriminated whether or not the open position detection switch 62 is ON, that is, whether or not the medium door 23 has been opened. If it is discriminated that the medium door 23 has not been opened (N in step ST32), then the processing returns to step ST31. The steps ST31 and ST32 are repeated until 2 seconds elapse, and if the closed position detection switch 61 is not switched ON within the period of 2 seconds, then the microcomputer 72 determines that a finger catch or the like has occurred with the medium door 23 and advances the processing to step ST33. In step sT33, the microcomputer 72 executes such "finger catch process" as to stop the opening and closing motor 64 immediately thereby to prevent such a trouble that a finger is catch and injured.

In short, when a medium 15 is mounted in the medium insertion slot 13, the microcomputer 72 recognizes the discharging signal in the closed state in step ST28 and causes the opening and closing motor 64 to rotate forwardly in step ST30 after an interval of a predetermined waiting time such as, for example, 6 seconds in step ST29, and then, when it recognizes the open position signal in step ST32, causes the opening and closing motor 64 to stop its rotation, but if the microcomputer 72 does not recognize the open position signal within a predetermined time such as, for example, 2 seconds after the start of operation of the opening and closing motor 64, then it performs processing of stopping the opening and closing motor 64 as a "finger catch" process in step ST33.

On the other hand, if it is discriminated in step ST32 that the open position detection switch 62 is ON, then the microcomputer 72 determines that the medium door 23 has come to the open state and thus causes the opening and closing motor 64 to stop.

Then, when a medium is in the medium insertion slot 13 and the medium door 23 is in an open state, that is, while, when it is discriminated in step ST32 that the open position detection switch 62 is ON (Y), the medium detection switch 32 is pushed up by the medium itself and is in an ON state, that is, until a state wherein it is discriminated in step ST34 that the medium detection switch 32 is ON (Y) is reached, the medium door 23 always remains in the open state.

If it is discriminated as given in step ST34 that a medium has been removed and the medium detection switch 32 has changed from ON (N), then the microcomputer 72 causes the opening and closing motor 64 to rotate reversely to perform an operation of closing the medium door 23 after a waiting time of 1 second as indicated in step ST35.

If it is discriminated as indicated in step ST36 that more than 2 seconds do not elapse after the opening and closing motor 64 starts the closing operation (N), then the processing advances to step ST37, in which the microcomputer 72 performs discrimination of whether or not the closed position detection switch 61 has changed to ON, that is, the medium door 23 is closed. If it is discriminated that the medium door 23 is not closed (N in step ST37), then the processing returns to step ST36 and this operation is repeated.

If it is discriminated in step ST36 during the repetitive operation that the closed position detection switch 61 has changed to ON (Y), then the microcomputer 72 determines that the medium door 23 has been brought into a closed state and thus causes the opening and closing motor 64 to stop. However, if it is discriminated in step ST36 that the closed position detection switch 61 has not been switched ON within 2 seconds, then the microcomputer 72 determines that a finger catch has occurred and performs the "finger catch process" in step ST38 to stop the opening and closing motor 64 immediately.

In short, when a medium 15 is mounted in the medium insertion slot 13, the microcomputer 72 keeps the medium door 23 in the open state in step ST34 while the insertion of the medium 15 is detected from the medium presence/absence signal, but when the insertion of the medium 15 is not detected any more from the medium presence/absence signal in step ST34, the microcomputer 72 performs the opening and closing motor 64 to rotate reversely to perform an operation of closing the medium door 23 after a predetermined waiting time such as, for example, 1 second in step ST35. Then, when the closed position signal is not recognized, for example, within a predetermined time such as 2 seconds after the start of operation of the opening and closing motor in step ST36, the microcomputer 72 determines that a "finger catch" has occurred in step ST38 and causes the opening and closing motor 64 to stop the opening and closing motor 64 thereby to prevent such a trouble that a finger is caught and injured.

While opening and closing control of the medium door 23 is executed by software by the arithmetic operations of the microcomputer 72 in steps ST1 to ST38 illustrated in FIGS. 8 and 9 described above, the various set times such as the waiting times indicated in the arithmetic operations in the steps illustrated in FIGS. 8 and 9 are a mere example, and actually, they can be reset to arbitrary times in accordance with a situation of use by means of the interface 74.

While a preferred embodiment of the present invention has been described using specific terms, such description is for illustrative purposes only, and it is to be understood that changes and variations may be made without departing from the spirit or scope of the following claims.

What is claimed is:

1. A recording and reproduction apparatus, comprising:
    a body having a medium insertion slot formed therein for receiving a medium;
    switch means for actuation by a user to select an open door position or a closed door position;
    a door provided at said medium insertion slot and having a front face and a rear face; and
    opening and closing means for allowing said door to enter said medium insertion slot in response to an operation of said switch means,
    wherein said door is arranged on a front panel of said body so that when said door is opened said door is positioned inside an upper portion of said insertion slot and said rear face of said door restricts movement of said medium in an upward direction, and
    wherein said rear face of said door has recessed portions serving as space portions so that the user can grip and insert said medium.

2. The recording and reproduction apparatus according to claim 1, wherein said opening and closing means includes a driving mechanism disposed on a back face side of a front panel of said body, and an arm member engaged with said driving mechanism and coupled to said door.

3. The recording and production apparatus according to claim 1, wherein said medium insertion slot is formed such that either one of a medium of a small size or another medium of a large size can be selectively inserted into said medium insertion slot.

4. The recording and reproduction apparatus according to claim 1, wherein a pair of guides for restricting movement of a medium of a small size in a lateral direction when the medium is to be inserted is provided in said medium insertion slot such that, when another medium of a large size is to be inserted, said guide is retracted by an introduction member.

5. The recording and reproduction apparatus according to claim 1, wherein said opening and closing means includes an opening and closing motor and a gear mechanism including a plurality of gears for transmitting power of said opening and closing motor to said door while converting a direction of rotation of said opening and closing motor into a turning direction of said door.

6. The recording and reproduction apparatus according to claim 1, wherein said opening and closing means includes an opening and closing motor having a rotary shaft extending in a vertical direction, a wheel gear held in meshing engagement with a door gear secured to said door, and a worm gear for transmitting rotation of said opening and closing motor to said wheel gear while converting a direction of rotation of said opening and closing gear into rotation of a horizontal direction so that rotation in the horizontal direction may be transmitted to said wheel gear to pivot said door.

7. A recording and reproduction apparatus, comprising:
    a body having a medium insertion slot formed therein into which a medium is to be inserted;
    a door provided in front of said medium insertion slot for opening and closing said medium insertion slot;

an opening and closing motor for pivoting said door through a gear mechanism;

closed position detection means for detecting a closed state of said door at a closed position of said door and outputting a closed position signal;

open position detection means for detecting an open state of said door at an open position of said door and outputting an open position signal;

switch means for actuation by a user to select the open state or the closed state of the door by a corresponding operation of said opening and closing motor;

medium detection means for detecting whether a medium is present in said medium insertion slot and outputting a medium presence/absence signal; and microcomputer means for receiving the closed position signal, the open position signal and the medium presence/absence signal and controlling at least one of an opening or closing speed, an opening or closing timing, and an open state or a closed state of said door in response to the received signals, wherein said microcomputer means deactivates said opening and closing motor when said closed state of said door is not detected after a predetermined time has elapsed following a door close command to said opening and closing motor, and wherein a rear face of said door has recessed portions serving as space portions so that the user can grip and insert said medium.

8. The recording and reproduction apparatus according to claim 7, wherein said microcomputer means controls, in order to open said medium door, said opening and closing motor to rotate forwardly and stop at the open position of said door, and controls, in order to close said door, said opening and closing motor to rotate reversely and stop at the closed position of said door.

9. The recording and reproduction apparatus according to claim 7, further comprising voltage changeover means interposed between said microcomputer means and said opening and closing motor for changing a driving voltage applied to said opening and closing motor, and wherein an opening operation and a closing operation of said medium door is performed through said voltage changeover means supplying said opening and closing motor with different respective driving voltages.

10. The recording and reproduction apparatus according to claim 7, wherein, when a medium is not mounted in said medium insertion slot, said microcomputer means controls said opening and closing motor such that, when the closed position signal changes from a closed state, said opening and closing motor rotates forwardly and then when the open position signal is recognized, said opening and closing motor stops, and when the open position signal is not recognized within a time determined in advance, said opening and closing motor stops.

11. The recording and reproduction apparatus according to claim 7, wherein, when a medium is not mounted in said medium insertion slot, said microcomputer means controls said opening and closing motor such that, when the open state of said door continues for a time determined in advance. and insertion of the medium is not detected from the medium presence/absence signal, said opening and closing motor rotates reversely to close said door, and when it is recognized within the time determined in advance that the open position signal changes from the open state, said opening and closing motor rotates reversely to close said door.

12. The recording and reproduction apparatus according to claim 7, wherein, when a medium is not mounted in said medium insertion slot, said microcomputer means controls said opening and closing motor such that, when the open state of said door continues for more than a time determined in advance and insertion of the medium is detected from the medium presence/absence signal, said opening and closing motor rotates reversely to perform a closing operation of said door, and when it is recognized that the open position signal does not reach the open position within the time determined in advance, said opening and closing motor stops.

13. The recording and reproduction apparatus according to claim 7, further comprising discharging means for detecting discharging of a medium and outputting a discharge signal, and wherein, when a medium is mounted in said medium insertion slot, said microcomputer means controls said opening and closing motor such that said opening and closing motor rotates forwardly after a waiting time determined in advance after the discharge signal is recognized in the closed state, and when the open position signal is recognized, said opening and closing motor stops, and when the open position signal is not recognized within the time determined in advance, said opening and closing motor stops.

14. The recording and reproduction apparatus according to claim 7, wherein, when a medium is mounted in said medium insertion slot, said microcomputer means controls said opening and closing motor such that, while insertion of the medium is detected from the medium presence/absence signal, said door is kept in the open state, and when the insertion of the medium is not detected any more from the medium presence/absence signal, said opening and closing motor rotates reversely to perform a closing operation of said door after a waiting time determined in advance, and then when the closed position signal is not recognized within a time determined in advance, said opening and closing motor stops.

15. A recording and reproduction apparatus, comprising:

a body having a medium insertion slot for insertion of a medium therein;

a door provided to open and close said medium insertion slot;

drive means for moving the door to an open position and to a closed position;

switch means for actuation by a user to select an open door position or a closed door position;

detector means for detecting the open door position and the closed door position; and control means connected to said drive means, said switch means and said detector means for controlling said drive means in response to actuation of said switch means, wherein said control means includes timing means, whereby said drive means is deactivated when said door is not detected to be closed after a predetermined time has lapsed following a door close command to said drive means, and wherein a rear face of said door has recessed portions serving as space portions so that the user can grip and insert said medium.

* * * * *